(12) United States Patent
Fang et al.

(10) Patent No.: US 9,319,171 B2
(45) Date of Patent: Apr. 19, 2016

(54) METHOD AND APPARATUS OF MANAGING BANDWIDTH ALLOCATION FOR UPSTREAM TRANSMISSION IN A UNIFIED OPTICAL-COAXIAL NETWORK

(71) Applicant: Futurewei Technologies, Inc., Plano, TX (US)

(72) Inventors: Liming Fang, Cupertino, CA (US); Jim Chen, Corona, CA (US); Li Zhang, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 543 days.

(21) Appl. No.: 13/729,671

(22) Filed: Dec. 28, 2012

(65) Prior Publication Data

US 2014/0133858 A1 May 15, 2014

Related U.S. Application Data

(60) Provisional application No. 61/726,966, filed on Nov. 15, 2012.

(51) Int. Cl.
*H04J 14/08* (2006.01)
*H04B 10/27* (2013.01)
*H04Q 11/00* (2006.01)
*H04J 3/00* (2006.01)

(52) U.S. Cl.
CPC .............. *H04J 14/086* (2013.01); *H04B 10/27* (2013.01); *H04J 3/00* (2013.01); *H04Q 11/0067* (2013.01); *H04Q 11/0071* (2013.01); *H04Q 2011/0077* (2013.01)

(58) Field of Classification Search
None
See application file for complete search history.

(56) References Cited

U.S. PATENT DOCUMENTS

| | | | |
|---|---|---|---|
| 2005/0058135 A1* | 3/2005 | Sisto et al. | 370/395.2 |
| 2007/0019957 A1 | 1/2007 | Kim et al. | |
| 2009/0011705 A1 | 1/2009 | Taori et al. | |
| 2013/0239165 A1* | 9/2013 | Garavaglia et al. | 725/129 |
| 2013/0272703 A1* | 10/2013 | Fang et al. | 398/58 |
| 2014/0079399 A1* | 3/2014 | Goswami et al. | 398/76 |

FOREIGN PATENT DOCUMENTS

| | | |
|---|---|---|
| CN | 1614944 A | 5/2005 |
| CN | 101166154 A | 4/2008 |
| CN | 101796745 A | 8/2010 |
| WO | 2011031831 A1 | 3/2011 |

OTHER PUBLICATIONS

Wei et al., "Test Trial of a New Broadband Access Technology Based on Coaxial Cable Network", 2010, entire document.*

(Continued)

*Primary Examiner* — Alex Skripnikov
(74) *Attorney, Agent, or Firm* — Conley Rose, P.C.; Grant Rodolph; Jonathan K. Polk

(57) ABSTRACT

A method of allocating bandwidth in a network comprising receiving a GATE message allocating a transmission time window in an optical portion of the network to a coaxial network unit (CNU) in a coax portion of the network, and generating a coax network resource map by mapping the transmission time window to communication channel resources in the coax portion of the network; and sending the coax network resource map to the CNU.

7 Claims, 8 Drawing Sheets

(56) References Cited

OTHER PUBLICATIONS

Chunhua et al., "A Novel Ethernet Over Coax Solution Employing Multi-Point Control Protocol", 2011, entire document.*

Foreign Communication From a Counterpart Application, PCT Application No. PCT/CN2013/087213, International Search Report dated Feb. 27, 2014, 6 pages.

Foreign Communication From a Counterpart Application, PCT Application No. PCT/CN2013/087213, Written Opinion dated Feb. 27, 2014, 3 pages.

Chen, J., "An Example of Designing a Coax Convergence Layer in EPoC," XP-002713588, Jun. 22, 2012, 9 pages.

"DOCSIS EoC for EPON in China," Oct. 2010, 14 pages.

"HomePNA Modem for MDU Endpoints," CG3310M, Sigma Designs, May 21, 2012, 2 pages.

Stascheit, B., "The Use of Ethernet-Over-Coax in HFC Networks," Scientific Atlanta, A Cisco Company, Transmission Technologies, Dec. 2007, 5 pages.

"Broadcom Introduces DOCSIS—Based EoC for EPON Product Portfolio in Support of China's Network Convergence," Press Release; http://www.broadcom.com/press/release.php?id-s523445, Oct. 27, 2010, 2 pages.

"Operating the EPON Protocol Over Coaxial Distribution Networks Call for Interest," IEEE 802.3 Ethernet Working Group, Nov. 8, 2011, Atlanta, Georgia, 38 pages.

Notice of Allowance dated Mar. 17, 2015, 19 pages, U.S. Appl. No. 13/730,272, filed Dec. 28, 2012.

* cited by examiner

METHOD AND APPARATUS OF MANAGING BANDWIDTH ALLOCATION FOR UPSTREAM TRANSMISSION IN A UNIFIED OPTICAL-COAXIAL NETWORK

CROSS-REFERENCE TO RELATED APPLICATIONS

The present application claims the benefit of U.S. Provisional Patent Application No. 61/726,966 filed Nov. 15, 2012 by Liming Fang, et al. and entitled "Method and Apparatus of Managing Bandwidth Allocation for Upstream Transmission in a Unified Optical-Coaxial Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. Ethernet passive optical network (EPON) is a PON standard developed by the Institute of Electrical and Electronics Engineers (IEEE) and specified in IEEE 802.3ah, which is incorporated herein by reference as if reproduced in its entirety.

In EPON, a single fiber can be used for both the upstream and the downstream transmission with different wavelengths. The OLT implements an EPON Media Access Control (MAC) layer for transmission of Ethernet Frames. The Multi-Point Control Protocol (MPCP) performs the bandwidth assignment, bandwidth polling, auto-discovery, and ranging. Ethernet frames are broadcast downstream based on the Logical Link Identifier (LLID) embedded in the preamble of the Ethernet frame. Upstream bandwidth is assigned based on the exchange of Gate and Report messages between an OLT and an ONU.

Ethernet over Coax (EoC) is a generic name used to describe all technologies which can be used for transmission of Ethernet frames over a unified optical-coaxial (coax) network. The name comes from the fact that, except for Data Over Cable Service Interface Specification (DOCSIS), all these technologies have in common that the Ethernet Frames are transmitted in the MAC layer. Different EoC technologies exist including Multimedia over Coax Alliance (MoCA), G.hn (a common name for a home network technology family of standards developed under the International Telecommunication Union (ITU) and promoted by the HomeGrid Forum), HomePNA Alliance (HPNA), and Home Plug Audio/Visual (A/V), and they have been adapted to run the outdoor coax access from an ONU to an EoC Head End with connected Customer Premises Equipment (CPEs) located in the subscriber homes.

There is a rising demand for EPON as an access system to interconnect with multiple coax cables to terminate the Coax Network Units (CNUs) located in the subscriber's home with an Ethernet PON over Coax (EPoC) architecture. However, none of the above-referenced EoC technologies provides and end-to-end optical to coax scheduling mechanism for transferring upstream data from connected CNUs on a coaxial segment of the unified optical-coaxial network to the OLT and OLT-connected fiber network. Consequently, there is a need in the art for methods and systems to provide a mechanism for end-to-end resource scheduling across a unified optical-coaxial network, e.g. EPoC where resource allocation in each domain may have a different structure depending on the physical layer architecture in the respective network segments.

SUMMARY

In an embodiment, the disclosure includes a coaxial line terminal (CLT) comprising an optical port configured to couple to an OLT via a PON, an electrical port configured to couple to a CNU via a coax electrical network, an index table having a plurality of first entries, a buffer having a plurality of second entries, wherein a first field of the first entries is configured to store a LLID of a CNU and a second field of the plurality first entries is configured to store a pointer to at least one of the second entries, a FIFO buffer configured to store one or more data transmission start times and a buffer management unit coupled to the buffer, index table, FIFO buffer, optical port and electrical port, wherein the buffer management unit is configured to: store an LLID of a CNU transmitting data to the CLT in the first field of one of the first entries, store data transmitted by the CNU identified by the stored LLID in one of the second entries, store a pointer to the one of the second entries the second field of the one of the first entries, store, in an entry of the FIFO buffer, a data transmission time allocated by the OLT to the CNU identified by the stored LLID, and transmit to the OLT the data stored in the entry pointed to by the stored pointer when an optical network timer in the CLT reaches the data transmission time stored in the entry of the FIFO buffer.

In another embodiment, the disclosure includes a method of allocating bandwidth in a network comprising receiving a GATE message allocating a transmission time window in an optical portion of the network to a CNU in a coax portion of the network, and generating a coax network resource map by mapping the transmission time window to communication channel resources in the coax portion of the network, and sending the coax network resource map to the CNU.

In another embodiment, the disclosure includes a CLT comprising an optical port configured to couple to an OLT via a PON, an electrical port configured to couple to a CNU via a coax electrical network, and a processor coupled to the optical port and the electrical port configured to map a transmission time window sent by the OLT to the CNU to communication channel resources in the coax electrical network and transmit the map to the CNU via the coax electrical network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatus to support the unified optical-coaxial network architecture. In one embodiment, this disclosure generates a resource map defining an allocation of network resources in the coaxial segment of the network based on the time window allocated in the optical segment and the connected CNUs with pending data queues. In another embodiment, a buffer is provided in a CLT (or similar transit node) to cache upstream traffic received in accordance with the resource map, wherein the cached data is forwarded upstream in the optical domain upon the opening of the respective optical domain time window. In yet another embodiment, a CLT is provided including a processor configured to map a transmission time window in the upstream optical segment to network channel resources in the downstream coaxial segment.

Figure 1:
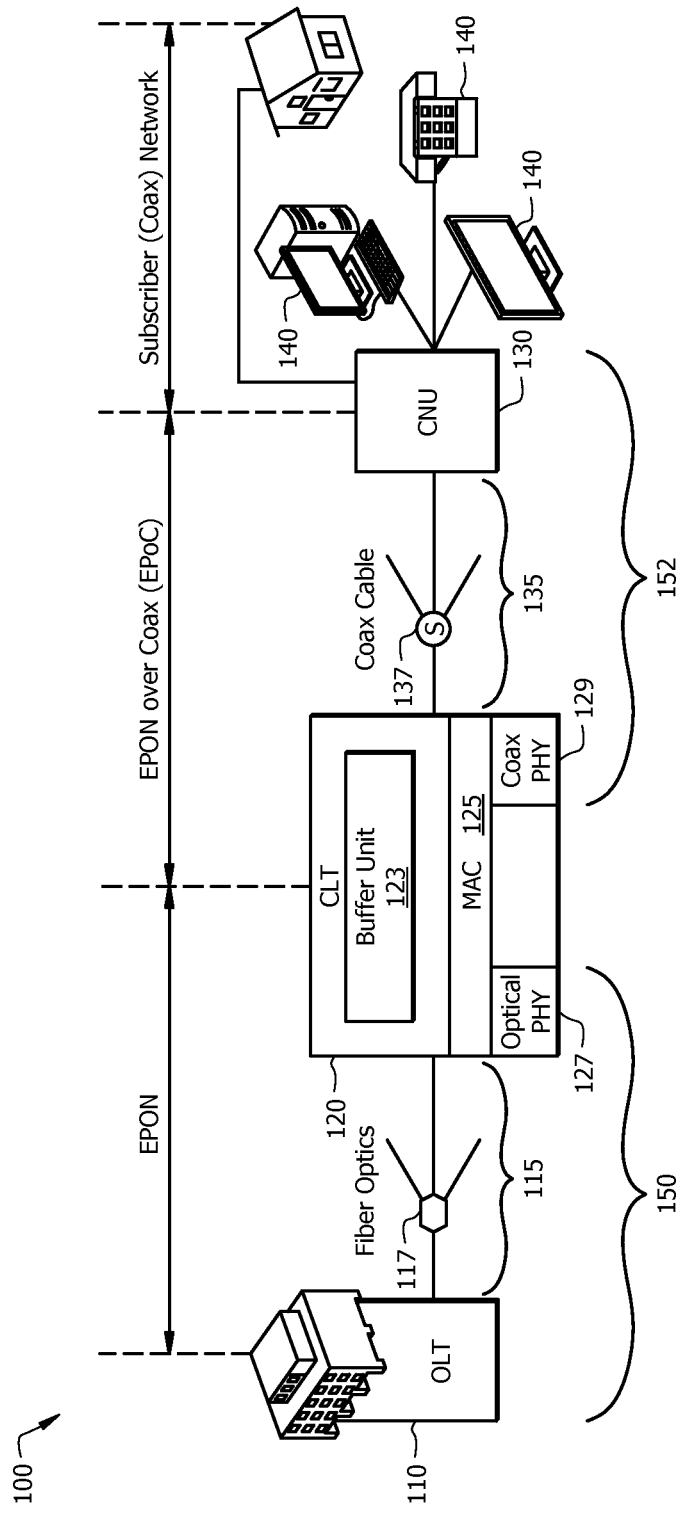
FIG. 1 is a diagram of a unified optical-coaxial network according to an embodiment of the disclosure.

Refer now to FIG. 1, which illustrates an embodiment of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140 and a CLT 120 positioned between OLT 110 and CNU 130, e.g. between the optical portion 150 and the coax portion 152. The OLT 110 may be coupled via an Optical Distribution Network (ODN) 115 to one or more CLTs 120, and optionally to one or more ONUs (not shown), in the optical portion 150. The ODN 115 may comprise fiber optics and an optical splitter 117 that couples OLT 110 to the CLT 120 and any ONUs. The CLT 120 may be coupled to the CNUs 130 via an electrical distribution network (EDN) 135, which may comprise a cable splitter 137. Although FIG. 1 shows one CLT 120 and one CNU 130, the unified optical-coaxial network 100 may comprise any number of CLTs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that it may be a communications network that does not require any active components to distribute data between the OLT 110 and the CLT 120. Instead, the optical portion 150 may use the passive optical components in the ODN 115 to distribute data between the OLT 110 and the CLT 120. Examples of suitable protocols that may be implemented in the optical portion 150 include the asynchronous transfer mode PON (APON) and the broadband PON (BPON) defined by the ITU Telecommunication Standardization Sector (ITU-T) G.983 standard, Gigabit PON (GPON) defined by the ITU-T G.984 standard, the EPON defined by the IEEE 802.3ah standard, and the wavelength division multiplexing (WDM) PON (WDM-PON), all of which are incorporated by reference as if reproduced in their entirety.

The OLT 110 may be any device configured to communicate with the CNUs 130 via the CLT 120. The OLT 110 may act as an intermediary between the CLTs 120 or CNUs 130 and another network (not shown). The OLT 110 may forward data received from the other network to the CLTs 120 or CNUs 130 and forward data received from the CLTs 120 or CNUs 130 onto the other network. Although the specific configuration of the OLT 110 may vary depending on the type of optical protocol implemented in the optical portion 150, in an embodiment, the OLT 110 may comprise an optical transmitter and an optical receiver. When the other network is using a network protocol that is different from the protocol used in the optical portion 150, the OLT 110 may comprise a converter that converts the other network protocol into the optical portion 150 protocol. The OLT converter may also convert the optical portion 150 protocol into the other network protocol.

The ODN 115 may be a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the CLT 120. It should be noted that the optical fiber cables may be replaced by any optical transmission media in some embodiments. In some embodiments, the ODN 115 may comprise one or more optical amplifiers. The ODN 115 typically extends from the OLT 110 to the CLT 120 and any optional ONUs (not shown) in a branching configuration as shown in FIG. 1, but may be alternatively configured as determined by a person of ordinary skill in the art.

The CLT 120 may be any device or component configured to forward downstream data from the OLT 110 to the corresponding CNUs 130 and forward upstream data from the CNUs 130 to the OLT 110. The CLT 120 may convert the downstream and upstream data appropriately to transfer the data between the optical portion 150 and the coax portion 152. (Although terms "upstream" and "downstream" may be used throughout to denote the locations of various network features relative to the OLT or similar unit, those skilled in the art will appreciate that the data flow on the network in the embodiments of the disclosure is bi-directional.) The data transferred over the ODN 115 may be transmitted or received in the form of optical signals, and the data transferred over the EDN 135 may be transmitted or received in the form of electrical signals that may have the same or different logical structure as compared with the optical signals. As such, the CLT 120 may encapsulate or frame the data in the optical portion 150 and the coaxial portion 152 differently. In an embodiment, the CLT 120 includes a media access control (MAC) layer 125 and physical layers (PHY), corresponding to the type of signals carried over the respective media. The MAC layer 125 may provide addressing and channel access control services to the physical layers. As such, the PHY may comprise optical PHY 127 and a coaxial PHY 129. In many embodiments, the CLT 120 is transparent to the CNU 130 and OLT 110 in that the frames sent from the OLT 110 to the CNU 130 may be directly addressed to the CNU 130 (e.g. in the destination address), and vice-versa. As such, the CLT 120 intermediates between network portions, namely an optical portion 150 and a coax portion 152 in the example of FIG. 1. As described further below, buffer unit 123 may be used in the transfer of data between the network domains to match the transmission cycle of the downstream portion (e.g. coax portion 152) to the transmission cycle of the upstream portion (e.g. optical portion 150). For example, in the context of unified optical-coaxial network 100, the CLT 120 may map the time domain multiplexing architecture of optical portion 150 to the orthogonal frequency division multiplex (OFDM) architecture of coax portion 152.

The electrical portion 152 of the unified electrical and coaxial network 100 may be similar to any known electrical communication system. The electrical portion 152 may not require any active components to distribute data between the CLT 120 and the CNU 130. Instead, the electrical portion 152 may use the passive electrical components in the electrical portion 152 to distribute data between the CLT 120 and the CNUs 130. Alternatively, the electrical portion 152 could use some active components, such as amplifiers. Examples of suitable protocols that may be implemented in the electrical portion 152 include MoCA, G.hn, HPNA, and Home Plug A/V, all of which are incorporated by reference as if reproduced in their entirety.

The EDN 135 may be a data distribution system that may comprise electrical cables (e.g. coaxial cable, twisted wires, etc.), couplers, splitters, distributors, and/or other equipment. In an embodiment, the electrical cables, couplers, splitters, distributors, and/or other equipment are passive electrical components. Specifically, the electrical cables, couplers, splitters, distributors, and/or other equipment may be components that do not require any power to distribute data signals between the CLT 120 and the CNU 130. It should be noted that the electrical cables may be replaced by any electrical transmission media in some embodiments. In some embodiments, the EDN 135 may comprise one or more electrical amplifiers. The EDN 135 typically extends from the CLT 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, electrically the CLT 120, and any subscriber devices 140. Specifically, the CNUs 130 may act as an intermediary between the OLT 110 and the subscriber devices 140. For instance, the CNUs 130 may forward data received from the OLT 110 to the subscriber devices 140, and forward data received from the subscriber devices 140 onto the OLT 110. Although the specific configuration of the CNUs 130 may vary depending on the type of unified optical-coaxial network 100, in an embodiment the CNUs 130 may comprise an electrical transmitter configured to send electrical signals to the CLT 120 and an electrical receiver configured to receive electrical signals from the CLT 120. Additionally, the CNUs 130 may comprise a converter that converts the electrical signal into electrical signals for the subscriber devices 140, such as signals in the asynchronous transfer mode (ATM) protocol, and a second transmitter and/or receiver that may send and/or receive the electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscriber devices 140 may include desktop computers, laptop computers, tablets, telephones, mobile telephones, residential gateways, televisions, set-top boxes, and similar devices.

Figure 2:
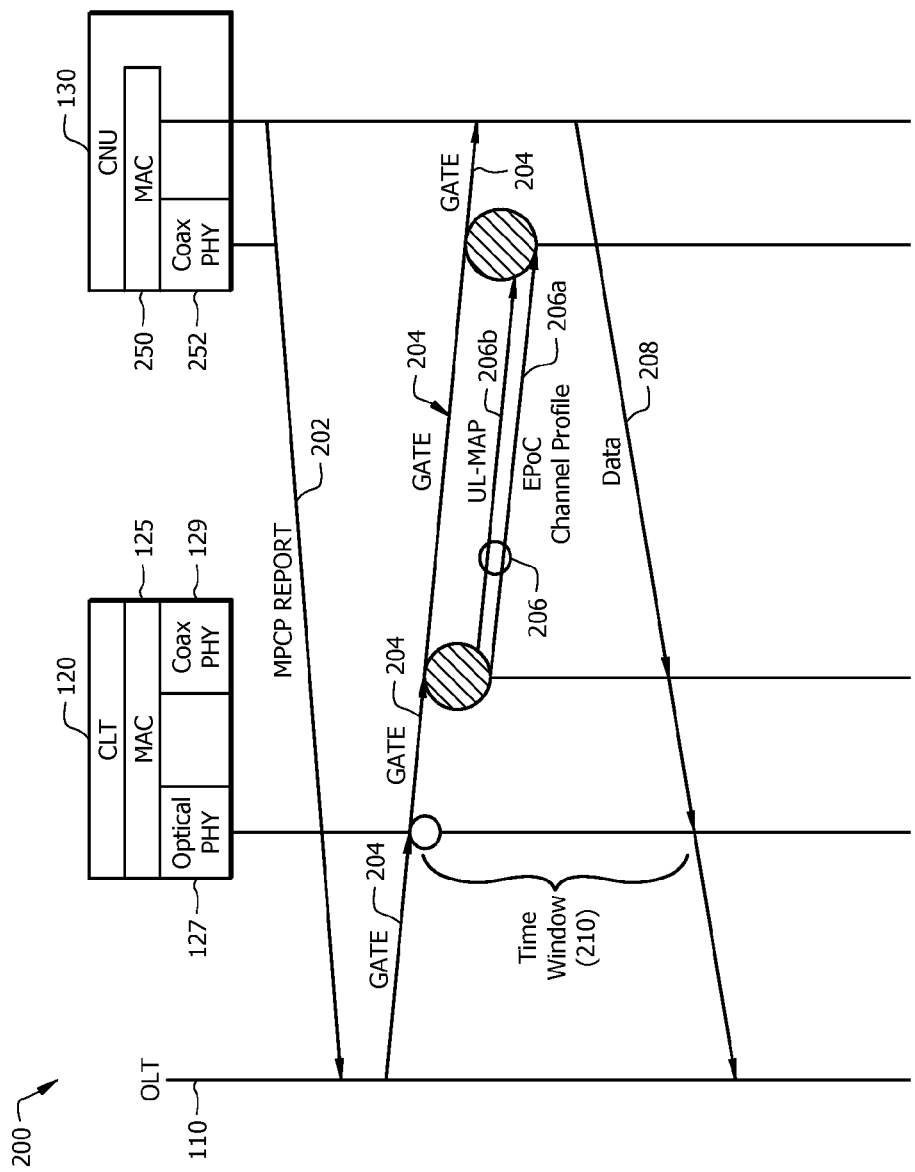
FIG. 2 is a protocol diagram of a resource allocation and data transfer protocol in accordance with an embodiment of the disclosure.

Refer now to FIG. 2 which illustrates a resource allocation protocol in accordance with an embodiment of the disclosure. In FIG. 2, time, in arbitrary units, may be viewed as running downward. Resource allocation protocol 200 will be described in the context of the unified optical-coaxial network 100 shown in FIG. 1; however, it will be understood by those skilled in the art that the principles set forth herein are not limited to the embodiment of FIG. 1.

A CNU 130 having data queued for transmission upstream may request the allocation of a time slot for sending the data by transmitting an MPCP REPORT message 202 to the OLT 110 in accordance with the embodiment of FIG. 1. The OLT 110 may respond with a GATE message 204. GATE message 204 may include a time window, or time slot, that may be used by the requesting CNU 130 for the upstream transmission of its queued data. In allocating the time window, the OLT 110 may include a time delay or offset, to accommodate delays in the coaxial domain. Such a time delay or offset may be referred to as a polling delay.

GATE message 204 may be forwarded to the requesting CNU 130 by the transit node (e.g. a CLT 120) intermediating the transfer of data between the optical and coaxial portions of a unified optical-coaxial network (e.g. optical portion 150 and coaxial portion 152 in FIG. 1). Forwarded GATE message 204 informs MAC 250 in CNU 130 as to the amount of data (e.g. number of bytes) the CNU 130 may send in the allocated time window. The CLT 120 may also store a window start time allocated via GATE message 204. The CLT 120 may employ buffer unit 123 (shown in FIG. 1) in storing the window start time. Buffer unit 123 will be described in further detail in conjunction with FIG. 5.

Further, CLT 120 may send a message frame 206 to the CNU 130 to configure the communication channel on, for example, coaxial portion 152 in FIG. 1 and to map communication resources therein to the upstream time window allocated by the OLT 110. Thus, in one embodiment CLT 120 may send channel profile 206a to the CNU 130. Channel profile 206a may be sent upon initialization of a communication channel between CLT 120 and CNU 130. An embodiment of a channel profile 206a will be described further below. Additionally, CLT 120 may convert the time window allocation information contained in GATE message 204 to an uplink media access plan (UL-MAP), and transmit such downstream via frame 206 UL-MAP 206b to the CNU 130. UL-MAP 206b may include frequency and time allocation information with respect to the transmission upstream of data queued by the CNU 130. In coaxial portion 152 in FIG. 1, upstream transmission of data may be transported in OFDM frames. Coax PHY 252 in the CNU 130 may load the upstream OFDM frame as allocated in UL-MAP 206b. Both UL-MAP 206b and the upstream transmission of the data will be described further below. Data 208 depicts the end-to-end (e.g. from a CNU 130 to OLT 110 on a unified optical-coaxial network). The CLT 120 (or similar transit node) may intermediate the upstream transmission by forwarding the data when time window 210 opens.

Figure 3A:
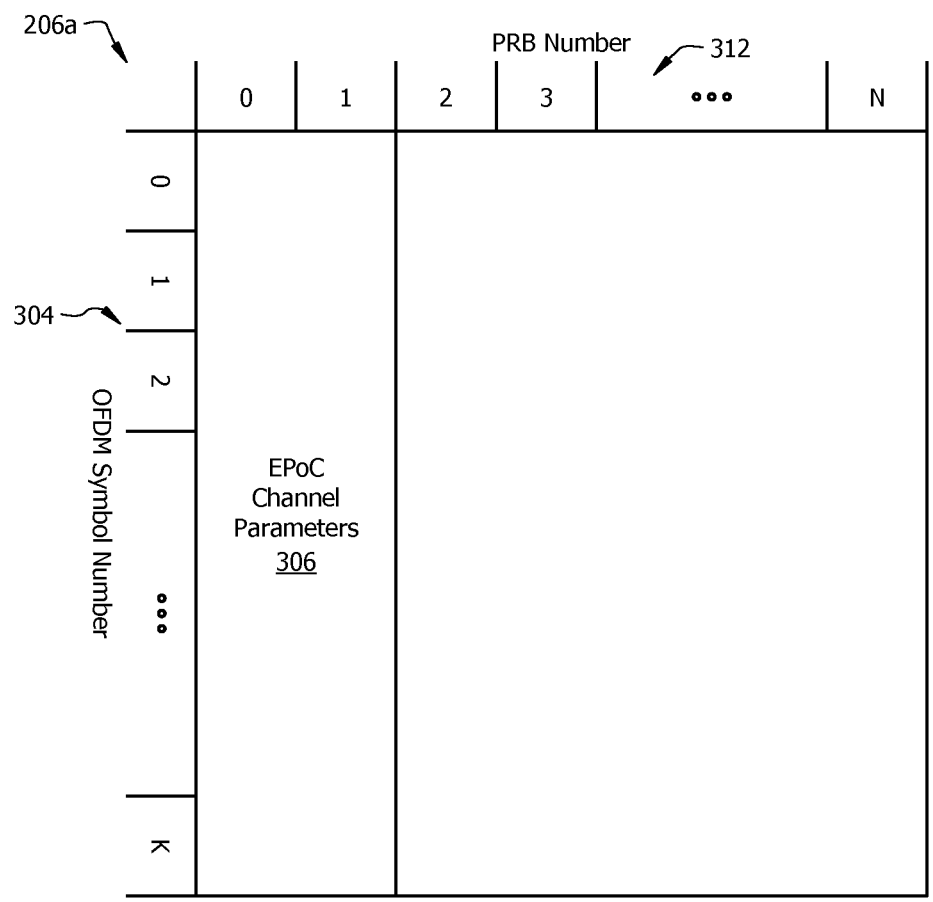
FIG. 3A is a schematic diagram of a coaxial channel profile message frame in accordance with an embodiment of the disclosure.

Refer now to FIG. 3A, which illustrates a channel profile 206a in accordance with an embodiment of the disclosure. Channel profile 206a comprises a plurality of OFDM physical resource blocks (PRB) 312. Each PRB may comprise a corresponding group of OFDM subcarriers. Illustrated in channel profile 206a are N+1 PRBs, numbered 0, 1, . . . , N. While it would be understood by those skilled in the art that, in principle, N could be any finite integer value, representative values may be N=15 in an embodiment of a coaxial portion 152 in FIG. 1, having 24 MHz channels and N=79 in an embodiment having 120 MHz channels. The channel profile 206a also may include a plurality of OFDM symbols 304. In the illustrative example of FIG. 3A, there are K+1 symbols, numbered 0, 1, . . . , K. Again, while K could be any finite integer, a representative value is K=74 in an OFDM frame in for example, the coaxial portion 152 of the unified optical-coaxial network 100 in FIG. 1. In channel profile 206a, the first two PRBs 312 (numbered 0 and 1) may be comprised of channel parameters 306. Channel parameters 306 may include data such as subcarrier bit loading, forward error correction (FEC) scheme, power level and other data to inform CNUs 130 of the network channel configuration upon initialization of the downstream communication channel, e.g. the communication channel on coaxial portion 152 in FIG. 1.

Figure 3B:
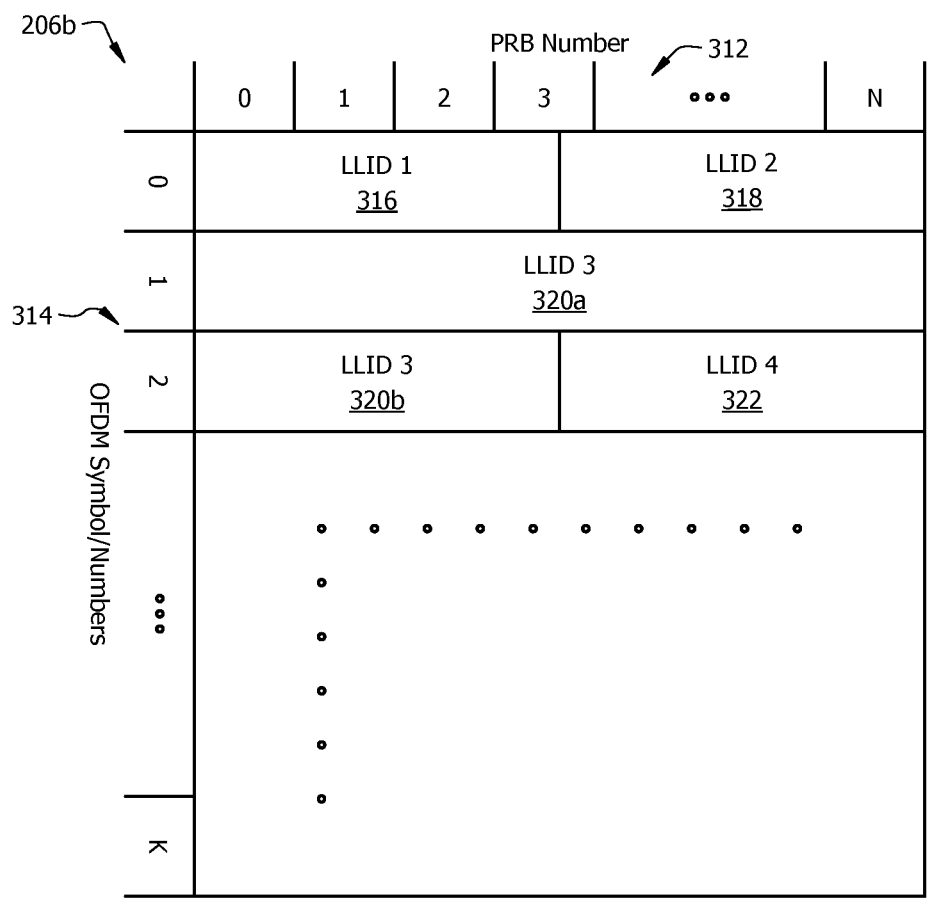
FIG. 3B is a schematic diagram of an uplink resource map (UL-MAP) message frame in accordance with an embodiment of the disclosure.

Refer now to FIG. 3B, which illustrates a UL-MAP 206b in accordance with an embodiment of the disclosure. UL-MAP 206b may include a plurality of physical resource blocks (PRB) 312 comprising a group of OFDM subcarriers that may be allocated to carry a data payload for a requesting CNU, such as a CNU 130 in FIG. 1. Similar to channel profile 206a, UL-MAP 206b contains N+1 PRBs, numbered 0, 1, . . . , N, in which representative values may be N=15 in an embodiment of an coaxial portion of a unified optical-coaxial network having 24 MHz channels and N=79 in an embodiment having 120 MHz channels. Likewise UL-MAP 206b also may include a plurality of OFDM symbols 314 numbered 0, 1, . . . , K. Again, a representative value may be K=74 in an OFDM frame in for example, the coaxial portion 152 of the unified optical-coaxial network 100 in FIG. 1.

In the UL-MAP 206b illustrated in FIG. 3B, four CNUs (or similar network units) identified as LLID1, LLID2, LLID3 and LLID4 and representing CNUs having requested time windows for sending queued data are allocated resources on the downstream communication channel. In the embodiment of FIG. 3B, these resources may comprise a portion of an OFDM symbol. Allocated resources may comprise one or more PRBs and one or more OFDM symbols (equivalently OFDM time slices). In such an embodiment, the frequency division and temporal structure of an OFDM symbol allows multiple simultaneous transmissions of data from a plurality of CNUs or other such network units. Contiguous PRBs may be assigned to the same network unit. Thus, allocation 316 may comprise an allocation of three PRBs (numbers 0-3) representing a plurality of OFDM subcarriers in the first OFDM symbol 314 (symbol number 0) to LLID1. The CNU identified by LLID1 may use allocation 316 to transmit its queued data. Similarly, allocation 318 may assign a plurality of PRBs 312 (PRB numbers 4-N) in the first OFDM symbol 314 (symbol number 0) to the CNU identified by LLID2. In the second OFDM symbol 314 (symbol number 1), allocation 320a may assign all N+1 PRBs 312 to LLID3, and in allocation 320b, LLID3 may be assigned an additional three PRBs 312 in the third symbol 314 (symbol number 2). The remaining PRBs in the third symbol 314 may be allocated to LLID4 in allocation 322. Thus, for example, a coax PHY 252 in FIG. 2, in the CNU 130 identified by LLID3 may transmit data upstream using all available OFDM subcarriers in the time slot represented by symbol number 1, and on the subcarriers comprising PRBs 0-2 in the time slot represented by OFDM symbol 2.

Although the application of a UL-MAP has been described in conjunction with UL-MAP 206b illustrated in FIG. 3B, it would be readily understood by persons skilled in the art that UL-MAP 206b is illustrative of the principles of the disclosure and that implementations of a UL-MAP in accordance with these principles are not restricted to the map depicted in FIG. 3B.

Figure 4:
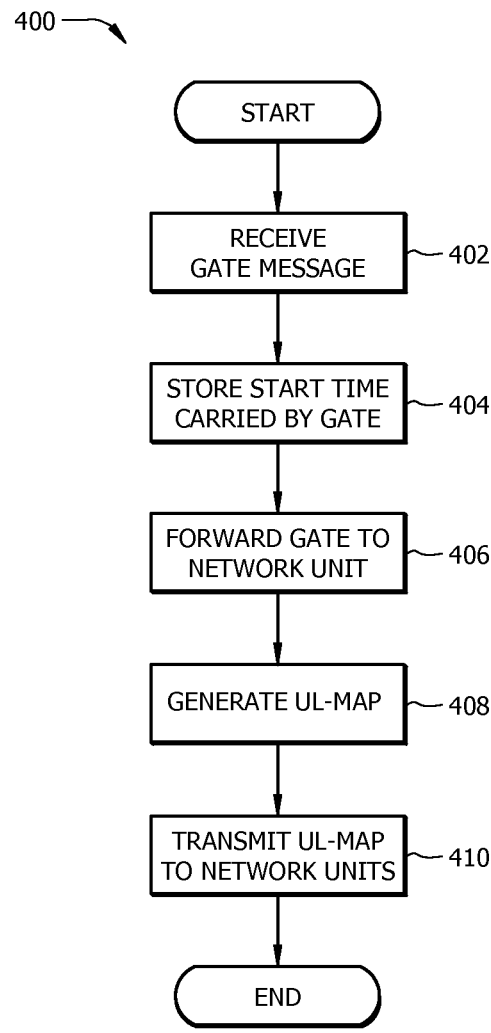
FIG. 4 is a flowchart of a process for allocating upstream bandwidth in a network in accordance with an embodiment of the disclosure.

Refer now to FIG. 4, which illustrates a flowchart of process 400 for allocating upstream bandwidth in accordance with an embodiment of the disclosure. Process 400 may be performed by a CLT 120 in FIG. 1. Process 400 may be described in the context of the unified optical-coaxial network 100 in FIG. 1; however, those skilled in the art will appreciate that the principles set forth in conjunction with process 400 are not limited to the embodiment illustrated in FIG. 1.

In step 402, a MPCP GATE message may be received by a CLT (or similar transit node). The GATE message may be sent from an OLT, allocating a time window to a requesting network unit, such as a CNU. As previously described, the time window represents the time during which the CNU may send its queued traffic upstream to the OLT. The OLT may incorporate a polling delay in its scheduling algorithm to accommodate delays on the downstream network segment, such as coaxial portion 152.

In step 404, the CLT (or similar transit node) may store the start time of the window included in the GATE message received in step 402. In step 406, the GATE message may be forwarded to the requesting CNU (or similar network unit). In step 408, the CLT (or similar transit node) may generate a resource map allocating network resources on the downstream network. The map is then transmitted to the CNUs (or similar network unit) in step 410. A receiving CNU may use the UL-MAP to transmit its queued data upstream to the CLT by loading the data into an OFDM frame as laid out in the resource map.

When a network unit, a CNU for example, sends its data upstream, the CLT (or similar transit node) may mediate the upstream flow of the data to the OLT (or similar head end unit), based on the time window received from the OLT. This may be implemented by buffering, or caching, the upstream data until the window allocated by the OLT (or similar head end unit) opens. The CLT may parse the OFDM frames sent by a CNU and recover the optical portion data frames therefrom, for example Ethernet frames in an EPON embodiment of the optical portion. The CLT may buffer the frames for subsequent transmission upstream to the OLT. Thus, CLT 120 in FIG. 1 may include buffer unit 123 which may be used to cache the recovered Ethernet frames and which will now be described in further detail in conjunction with FIG. 5.

Figure 5:
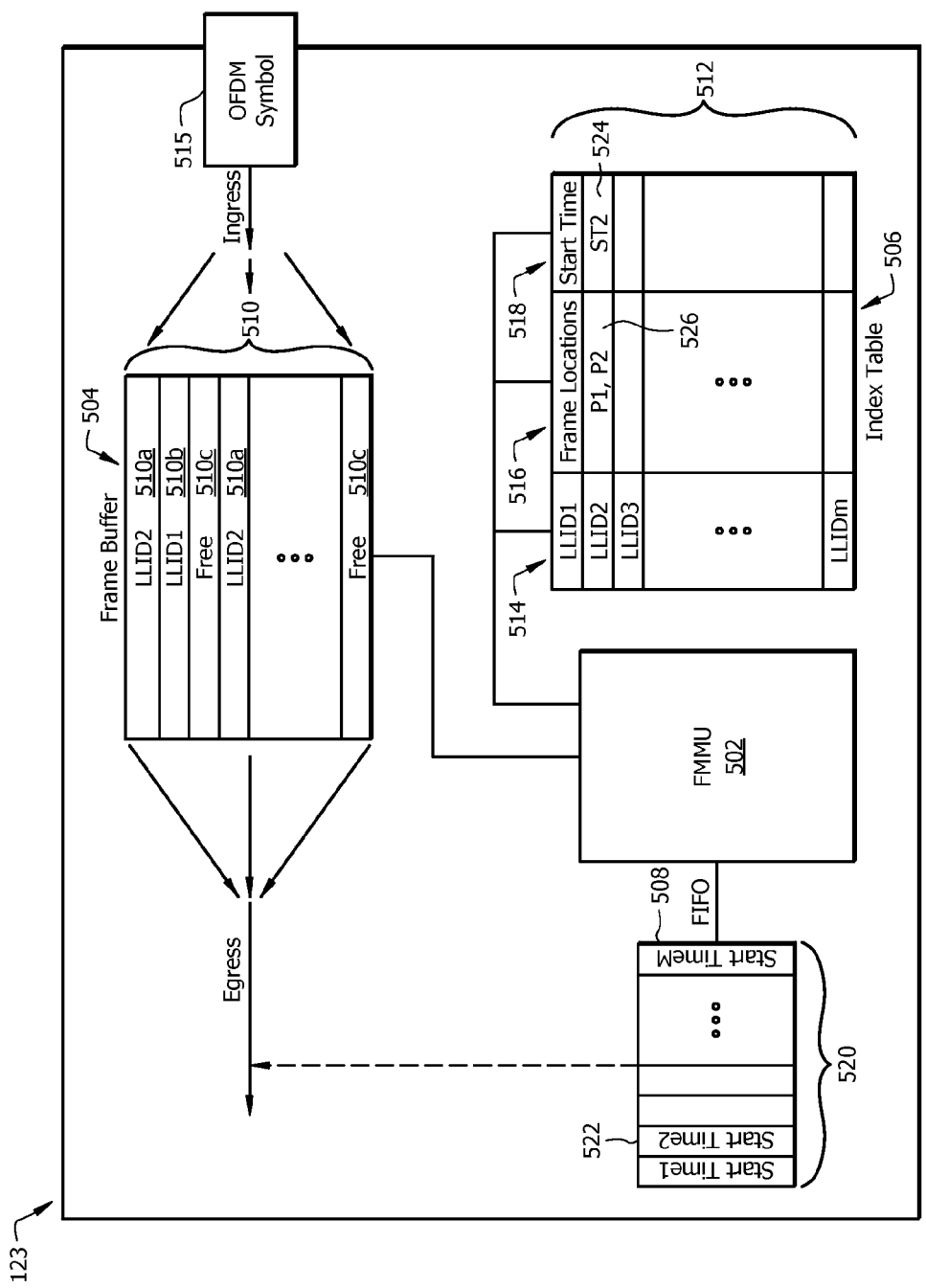
FIG. 5 is a block diagram of a buffer unit in accordance with an embodiment of the disclosure.

Referring to FIG. 5, there is illustrated a block diagram of a buffer unit 123 in accordance with an embodiment of the disclosure. Buffer unit 123 may be described in the context of a unified optical-coaxial network 100 in FIG. 1; however, those skilled in the art will appreciate that the principles set forth in conjunction with FIG. 5 are not limited to the embodiment illustrated in FIG. 1.

Buffer unit 123 may include a frame memory management unit (FMMU) 502, a frame buffer 504, an index table 506 and a FIFO buffer 508. Symbols on coaxial portion 152 may comprise, for example, OFDM symbols sent by network units, such as CNUs 130 in FIG. 1. As described above, the CLT may parse the OFDM symbols and cache the recovered frames in frame buffer 504, schematically depicted by the ingress path in FIG. 5. FMMU 502 may allocate and free resources in frame buffer 504.

Frame buffer 504 may include a plurality of entries, or registers 510 that may be used to store data received from one or more of the CNUs 130 (or similar network unit). Up to this point, the description has focused on the message protocols, etc. with respect to a single requesting network unit for simplicity in understanding the principles of the disclosure. However, as described in conjunction with the embodiment of UL-MAP 206b in FIG. 3B, a plurality of network units may request allocation of a time window for the upstream transmission of data and the CLT (or similar transit node) may apportion resources on the downstream communication link among two or more network units, e.g. CNUs. Thus, the data received by a CLT may include data sent by one or more CNUs (or similar network units). Consequently, different entries 510 in frame buffer 504 may contain data sent by different network units (identified in FIG. 5 by a LLID number). Thus, for example, registers 510a include data from LLID2 and register 510b includes data from LLID1. Other registers, e.g. registers 510c, may be free and available for allocation by FMMU 502. It would be understood by those skilled in the art that various embodiments of a frame buffer may include more registers than the number of network units attached to the downstream network or network units with queued traffic, and that in such a case there would be unused registers in the frame buffer. Thus, a frame buffer 504 may be sized to accommodate any number of network units that might be reasonably contemplated to be used in the embodiment of a unified optical-coaxial network.

Index table 506 may be maintained by FMMU 502 to track the allocation of registers 510. Index table 506 may comprise a plurality of entries or registers 512. Registers 512 may be indexed by CNU, again identified by a LLID in FIG. 5. In the illustrative embodiment in FIG. 5, m registers 512 are associated with LLID1, LLID2, LLID3, . . . , LLIDm, respectively (corresponding to m CNUs 130). The LLIDs may be stored in respective fields 514 of registers 512. Each register 512 may additionally include a field 516 comprising locations, in frame buffer 504, of the data frame or frames sent by the respective CNUs (or similar network units). For example, a field 516 may comprise pointers into frame buffer 504 corresponding to the respective registers 510 holding the data frames sent by the CNU identified in the corresponding field 514. The pointers may be loaded into field 516 by the FMMU 502. Index table 506 may also include fields 518 including a value indexing a start time allocated to the corresponding CNU. For example, a field 518 may include a pointer into an entry 520 in FIFO buffer 508, as further described below. It would be understood of those skilled in the art that similar considerations to those discussed above with respect to the sizing of frame buffer 504 also are applicable to the sizing of index table 506.

FIFO buffer 508 may include a plurality of entries or registers 520. When a GATE message is received at a CLT (or similar transit node) as described above, FMMU 502 may store the start time contained in the GATE message in one of registers 520 in FIFO buffer 508. In particular, the start time may be stored in the next register 520 in sequence, in accordance with the architecture of FIFO buffer 508. In the illustrative embodiment of FIFO buffer 508, the same number, m, of registers 520 as LLIDs (here LLID1, LLID2, . . . , LLIDm) is illustrated. However, it would be understood by those in the art that various implementations of FIFO buffer may include more registers than the number of network units attached to the downstream network or network units with queued traffic, and that in operation in that case, there would be unused registers in the FIFO buffer.

In operation, the CLT may maintain a clock (not shown) with respect to the upstream network portion, e.g. optical portion 150 in FIG. 1. When that clock reaches the start time in the entry of FIFO buffer 508 pointed to by a read pointer (not shown) or similar index in accordance with the architecture of FIFO buffer 508, the data frame belonging to the corresponding network unit is read from frame buffer 504, as schematically depicted by the egress path in FIG. 5 and the dashed arrow, and transmitted upstream via the optical portion of the network. FMMU 502 links the corresponding one of frame buffer registers 510 and the start time through the pointer stored in a field 518 in index table 506. Thus, for example, if the FIFO buffer 508 read pointer (not shown) points to the register 522, upon the optical portion 150 clock reaching Start Time 2, the data frames belonging to LLID2, which are depicted as being stored in registers 510a in frame buffer 504, will be transmitted on the optical portion by the CLT to the OLT. In this example, FMMU 502 links Start Time 2 in entry 522 and registers 510a via the pointer to entry 522, denoted ST2, stored in field 524, of index table 506 and pointers to registers 510a, denoted P1 and P2, in field 526. In like fashion, each of Ethernet frames sent upstream from a network unit, e.g. CNU is forwarded by the CLT (or similar transit node) in the window granted by OLT to the respective one of CNUs, as described above.

Figure 6:
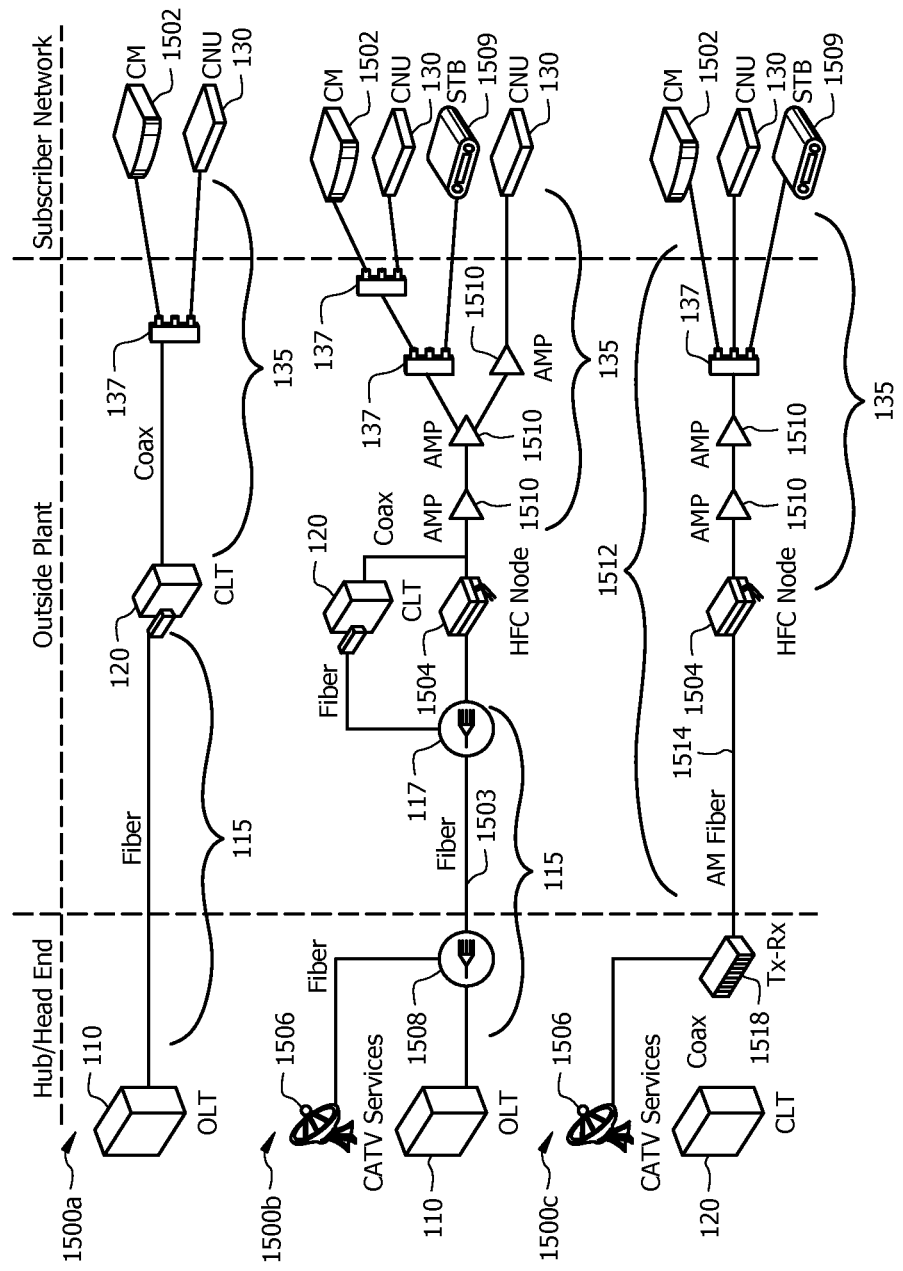
FIG. 6 is a schematic diagram of deployments of a unified optical-coaxial network in accordance with embodiments of the disclosure.

To further appreciate the unified optical-coaxial network 100, refer now to FIG. 6 illustrating unified optical-coaxial networks 1500a, 1500b, and 1500c representing various deployment environments in accordance with embodiments of the disclosure. Unified optical-coaxial network 1500a comprises an OLT 110 which may be located at a hub or head end facility coupled to CLT 120 via ODN 115. Each of OLT 110 and CLT 120 may comprise a processor and other logic (not shown) configured to manage and allocate upstream bandwidth in accordance with embodiments disclosed hereinabove. Further, CLT 120 may, for example, include a processor and other logic (not shown) configured buffer upstream traffic and forward the traffic to OLT 110 during a time window allocated by the OLT 110 as described in conjunction with embodiments disclosed above.

CLT 120 may be coupled to subscriber devices such as cable modem (CM) 1502 and CNU 130. It would be appreciated that subscriber devices CM 1502 and CNU 130 are provided by way of example, and other types of subscriber devices may be connected to CLT 120. As described in conjunction with FIG. 1, CNU 130 also may act as an intermediary between OLT 110 and subscriber devices such as a personal computer, television, set-top box and the like (not shown in FIG. 6). CLT 120 may be coupled to the CNU 130 and CM 1502 via EDN 135, which may comprise splitter 137. Further, in unified optical-coaxial network deployment 1500a EDN 135 may comprise passive coaxial cables.

Unified optical-coaxial network 1500b may comprise a unified optical-coaxial network deployment through amplifiers in conjunction with cable television (CATV) services 1506. In unified optical-coaxial network 1500b, OLT 110 is coupled to CLT 120 through ODN 115. ODN 115 may carry CATV services 1506 via multiplexer 1508, which multiplexes CATV signals onto fiber 1503. Additionally, multiplexer 1508 may multiplex signals from OLT 110 onto fiber 1503. CATV signals multiplexed onto fiber 1503 may comprise amplitude modulated (AM) analog signals, while signals from OLT 110 multiplexed onto fiber 1503 may comprise digital signals. ODN 115 may include a splitter 117, which may split the digital signals from OLT 110 and analog signals from CATV services 1506 on fiber 1503 and couples these signals to CLT 120 and hybrid fiber-coaxial (HFC) node 1504, respectively. Traditionally, HFC networks have been used to carry CATV services, but it would be appreciated that other services such as high-speed data services and telephony services may also be carried.

EDN 135 may couple signals from CLT 120 and HFC node 1504 to subscriber devices such as CNUs 130, CM 1502, and set-top box (STB) 1509. Again, CNUs 130, CM 1502, and STB 1509 are shown by way of example and it would be appreciated that other types of subscriber devices may be coupled to CLT 120. Electrical signals from CLT 120 and HFC node 1504 may comprise signals in distinct frequency bands and may be combined on EDN 135. For example, electrical signals from CLT 120 may comprise digital signals in a band of about 800 Megahertz (MHz) to about 1 Gigahertz (GHz) and electrical signals from HFC 1504 may comprise analog signals in a band from about 85 MHz to about 750 MHz. However, it would be understood by those skilled in the art that the aforementioned frequency bands are provided by way of illustration and the principles of the disclosure are not limited to these bands.

EDN 135 may further comprise splitters 137 and amplifiers 1510. Amplifiers 1510 may be included in EDN 135 to mitigate against attenuation of electrical signals carried thereon. It would be recognized by those skilled in the art that, in various embodiments, the number of amplifiers 1510 used may be different or an embodiment may not use any amplifiers 1510.

Unified optical-coaxial network 1500c comprises a unified optical-coaxial architecture in which a CLT 120 may be located in a hub/head end facility and digital signals form the CLT 120 overlay an HFC portion 1512 which provides an intermediate optical fiber link, optical fiber 1514. Digital electrical signals from CLT 120 may be amplitude modulated onto an optical signal by optical transceiver 1518. Video signals from CATV services 1506 may also be amplitude modulated onto the optical signal by transceiver 1518 and transmitted to HFC node 1504. HFC node 1504 may convert optical signals received on optical fiber 1514 to electrical signals for transmission via EDN 135 to subscriber devices such as CM 1502, CNU 130, and STB 1509. CM 1502, CNU 130, and STB 1509 as provided in unified optical-coaxial network 1500c are by way of example and not intended to limit the disclosed embodiment to those types of devices, as would be understood by those skilled in the art. Electrical signals output by HFC node 1504 may comprise digital electrical signals arising from the aforementioned digital electrical signals from CLT 120, and analog electrical signals arising from CATV services 1506. As described in conjunction with unified optical-coaxial network 1500b, these respective electrical signals may comprise signals in distinct frequency bands.

Figure 7:
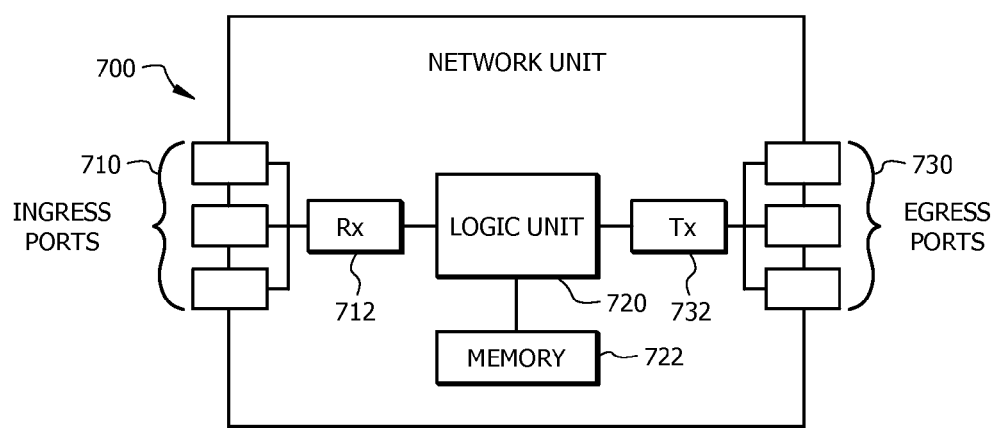
FIG. 7 illustrates a block diagram of an embodiment of a network unit in accordance with embodiments of the disclosure.

At least some of the features/methods described in the disclosure may be implemented in a network apparatus or component, such as network nodes or units described herein. For instance, the features/methods of the disclosure may be implemented using hardware, firmware, and/or software installed to run on hardware. The network apparatus/component or unit may be any device that transports frames through a network, e.g. an OLT, ONU, etc. FIG. 7 illustrates an embodiment of a network unit 700, in which the disclosed methods and systems may be implemented. The network unit 700 may be any device that transports data through the network. The network unit 700 may comprise one or more ingress ports or units 710 coupled to a receiver (Rx) 712 for receiving signals and frames/data from other network components. The network unit 700 may comprise a logic unit 720 (e.g. MAC logic described above) to determine to which network components to send data. The logic unit 720 may be implemented using hardware, firmware, software, or combinations thereof. Specifically, the logic unit 720 may include a processor (which may be referred to as a central processor unit or CPU) that is in communication with memory devices 722, including read only memory (ROM) and/or random access memory (RAM). The logic unit 720 may be implemented as one or more general-purpose CPU chips running software stored in memory 722, or may be part of one or more application specific integrated circuits (ASICs) and/or digital signal processors (DSPs). The network unit 700 may also comprise one or more egress ports or units 730 coupled to a transmitter (Tx) 732 for transmitting signals and frames/data to the other network components. The components of the network unit 700 may be arranged as shown in FIG. 7.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g. k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A coaxial line terminal (CLT) comprising:
   an optical port configured to couple to an optical line terminal (OLT) via a passive optical network (PON);
   an electrical port configured to couple to a coaxial network unit (CNU) via an electrical network;
   an index table having a plurality of first entries;
   a buffer having a plurality of second entries, wherein a first field of the first entries is configured to store a Logical Link Identifier (LLID) of the CNU and a second field of the plurality of first entries is configured to store a pointer to at least one of the second entries;
   a first-in first-out (FIFO) buffer configured to store one or more data transmission start times; and
   a buffer management unit coupled to the buffer, the index table, the FIFO buffer, the optical port, and the electrical port and configured to:
   instruct storage of the LLID in the first field;
   instruct storage of data transmitted by the CNU and identified by the LLID in a first register of the plurality of second entries;
   instruct storage of the pointer in the second field, wherein the pointer points to the first register;
   instruct storage, in an entry of the FIFO buffer, of a first data transmission start time allocated by the OLT to the CNU and identified by the LLID; and
   transmit the data to the OLT when an optical network timer in the CLT reaches the first data transmission start time.

2. The CLT of claim 1, further comprising a processor coupled to the electrical port and configured to parse orthogonal frequency-division multiplexing (OFDM) symbols transmitted by the CNU into Ethernet frames for storage in the first register.

3. The CLT of claim 2, wherein the processor is further configured to send channel profile data to the CNU, and wherein the channel profile data comprise configuration information for the CNU to transmit the OFDM symbols.

4. The CLT of claim 1, wherein the first data transmission start time includes a delay time of the electrical network.

5. The CLT of claim 1, further comprising a processor coupled to the optical port and configured to map a transmission time window allocated by the OLT into an uplink resource map for the electrical network.

6. The CLT of claim 5, wherein the processor is further configured to transmit the uplink resource map to the CNU.

7. The CLT of claim 5, wherein the uplink resource map comprises an allocation of one or more physical resource blocks (PRB) and one or more orthogonal frequency-division multiplexing (OFDM) symbols in an OFDM frame to the CNU.

* * * * *